United States Patent [19]

Nakayama et al.

[11] Patent Number: 4,975,547
[45] Date of Patent: Dec. 4, 1990

[54] MULTI-POSITION ELECTRICAL SWITCH

[75] Inventors: Kiyoshi Nakayama, Shizuoka; Toshio Yoshioka, Fujieda; Kiyotaka Yamaguchi, Kyoto, all of Japan

[73] Assignees: Murakami Kameido Co., Ltd., Shizuoka; Omron Tateishi Electronics, Co., Kyoto, both of Japan

[21] Appl. No.: 360,784

[22] Filed: Jun. 2, 1989

Related U.S. Application Data

[63] Continuation-in-part of Ser. No. 180,237, Apr. 11, 1988, abandoned.

[30] Foreign Application Priority Data

Oct. 13, 1986 [JP] Japan .................................. 61-155713

[51] Int. Cl.$^5$ ........................ H01H 13/70; G02B 7/18
[52] U.S. Cl. ..................................... 200/5 R; 200/315; 200/517; 200/16 C
[58] Field of Search ................... 200/1 R, 1 U, 4, 5 R, 200/5 A, 5 E, 5 EA, 6 R, 6 A, 17 R, 18, 313, 314, 315, 512–517; 350/604

[56] References Cited

U.S. PATENT DOCUMENTS

| | | | |
|---|---|---|---|
| 2,748,205 | 5/1956 | Forstrom | 200/5 EA |
| 4,349,708 | 9/1982 | Asher | 200/6 A |
| 4,428,649 | 1/1984 | Main et al. | 200/4 X |
| 4,476,356 | 10/1984 | Nakayama et al. | 200/6 A |
| 4,499,342 | 2/1985 | Nakayama | 200/5 EA X |
| 4,590,338 | 5/1986 | Suzuki | 200/5 R |
| 4,611,102 | 9/1986 | Ishida | 200/5 R |
| 4,626,083 | 12/1986 | Nakayama et al. | 350/604 |
| 4,654,488 | 3/1987 | Westfall | 200/5 R |
| 4,687,200 | 8/1987 | Shirai | 200/5 A X |
| 4,710,602 | 12/1987 | Baity et al. | 210/5 A X |

Primary Examiner—J. R. Scott
Attorney, Agent, or Firm—Michael J. Striker

[57] ABSTRACT

The multi-position electrical switch includes a printed circuit (PC) board arranged in a casing and supporting an array of stationary contacts encircling a light emitting element fixed on the PC board. A resilient rubber sheet covers the PC board and supports an array of movable contacts arranged opposite the stationary contacts. A control knob having a central opening rests on the rubber sheet in the region of the movable contacts. The bottom of the knob is formed with a tubular projection communicating with the central opening of the knob and extending to the level of an opening in the rubber sheet around the light emitting element. The bottom of the knob is provided with four pin-shaped stoppers which delimit the tilting movement of the knob in four directions and the pressing surface portions of the bottom are inclined such as to evenly engage a depressed region of the rubber sheet when the knob is tilted in one of the four directions and the corresponding movable contacts are lowered and pressed against the opposite stationary contacts. The annular end face of the tubular projection has four inclined sections oriented according to the four tilting directions. In a tilted position of the knob, a corresponding inclined section fully engages the flat surface of the PC board thus safeguarding the actuation of the selected contacts only.

8 Claims, 7 Drawing Sheets

MULTI-POSITION ELECTRICAL SWITCH

CROSS-REFERENCE TO RELATED APPLICATION

This is a continuation-in-part of application Ser. No. 180,237, filed Apr. 11, 1988, now abandoned.

BACKGROUND OF THE INVENTION

The present invention relates to electrical switches. More particularly, the invention relates to a multi-position electrical switch for use in the remote control of a rearview mirror of a motor vehicle.

Each of the two outside rearview mirrors of a motor vehicle is provided with two electric motors and a driving transmission in a mirror body, and the angle of inclination of the respective rearview mirrors is remotely controlled by means of a control switch arranged in a compartment of the motor vehicle so as to adjust the horizontal inclination in rightward or leftward direction and the vertical inclination in upward or downward direction. Known are two construction types of such a control switch. In one construction, as disclosed in U.S. Pat. No. 4,349,708, a joystick is projected at the top of a casing, the joystick is rotatably supported by spherical supporting means in the casing, movable- and stationary contact groups are disposed at the circumference of a lower portion of the joystick, and the selected contacts are closed by the actuation of the joystick to control the normal or reverse rotation of the electric motor or to stop the same. However, in this type, in order to reliably open or close the contacts, a return spring must be attached to the joystick. Consequently, the overall configuration of the switch cannot be sufficiently reduced in size, and the large number of components increase manufacturing cost.

The other known type includes a printed circuit (PC) board supporting a motor control circuit, a compressible conductive rubber sheet superposed on the PC board, and a seesaw type knob tiltable in four directions for switching the contacts on the PC board by pressing the conductive rubber sheet.

When the knob is tilted in a vertical or horizontal direction, the conductive rubber sheet at the position corresponding to the selected direction is pressed to close the corresponding contacts on the PC board, and the angle of inclination of the mirror element is adjusted by rotating the motor in a forward or reverse direction.

However, in the switch of the latter type, the operator may accidentally actuate several contacts simultaneously, thus causing an electric shortcircuit therebetween and the mirror driving motor may become damaged. Similarly, when the knob is pushed in the intended direction, the contact adjacent to the intended contact can be also simultaneously contacted and the reliability of the switching operation is impaired. To eliminate such drawbacks, in the U.S. Pat. No. 4,476,356, a rod-like or crest-sectional projection is used to act as a fulcrum at the center of the lower surface of the seesaw-type knob body to maintain an insulating distance between the movable contact and the corresponding stationary contact, but even this design cannot always solve all the above-mentioned problems.

SUMMARY OF THE INVENTION

It is therefore an object of this invention to provide a multi-position electrical switch for actuating a rearview mirror without erroneous operation. Another object of the invention is to provide a multi-position electrical switch which can be conveniently actuated from a compartment of a motor vehicle.

Still another object of the invention is to provide a multi-position electrical switch of this kind in which a cylindrical lamp container formed on the lower surface of a knob body does not interfere with the inclination of the knob.

In order to achieve the objects of the invention and to overcome the problems of the prior art, the multi-position electrical switch for controlling a rearview mirror of a motor vehicle according to the invention comprises a PC board arranged in a casing, an insulating rubber sheet arranged on the top of the PC board and having a plurality of movable contacts, a control knob arranged on the top of the insulating rubber sheet, means for delimiting the angle of tilting of the control knob, and a light emitting element arranged in a cylinder at the center in the control knob. The lower end face of the cylinder is formed with four curved surfaces defined by intersecting surfaces of the cylinder and an imaginary quadrangular pyramid having an obtuse vertex angle. The delimiting means is composed of the curved surfaces and stoppers projected at the four corners of the lower surface of the knob.

The respective movable contacts cooperate with the assigned stationary contacts on the PC board so that the delimiting means permit the control knob to incline in upward or downward direction or rightward or leftward direction to alter the vertical or horizontal angle of the mirror element of the rearview mirror, but prevent the knob from inclining any further. Since the knob cannot be inclined unintentionally in the other direction, erroneous operation is prevented.

The switch of this invention has, in addition to the control knob for adjusting the rearview mirror angle as described above, a slide switch element for selecting the right side or the left side rearview mirror, and a switch element for folding a mirror body.

The insulating rubber sheet is formed with hollow, truncated conical swells each supporting a movable contact. Four juxtaposed pairs of the swells are situated below the bottom side of the knob, that is, eight swells in total are provided concentrically below the lower portion of the control knob. Two additional swells with movable contacts for folding a rearview mirror body are arranged laterally of the eight swells.

The knob of the slide switch element is actuated first to select either the right- or the left side rearview mirror. Thereafter the control knob is inclined in the desired direction to depress a movable contact on the rubber sheet downwardly against the opposite stationary contact on the PC board, thus closing the corresponding part of the control circuit and the electric motor in the rearview mirror body is driven to adjust the tilting angle of the rearview mirror in the selected horizontal or vertical direction. The motor is driven continuously while the control knob is being pressed. If the pressing of the control knob is released, the movable contact on the rubber sheet is disconnected from the stationary contact and the motor is stopped by opening the control circuit. The mirror folding switch element is connected to a motor control unit for folding a mirror body. This switch element is a one-push type switch with an automatic return. The knob of the switch element is inclined in either resetting or setting direction to press the movable contact against the stationary one to turn on the control unit. Then, the contacts are held against one another by the control unit to drive the motor until the mirror body is moved from its erected position to its folded position or vice versa; the motor is then stopped by the operation of a limit switch.

BRIEF DESCRIPTION OF THE DRAWINGS

These and other objects, features and advantages of the present invention will become more apparent from the following description of a preferred embodiments taken in conjunction with the accompanying drawings, in which.

DESCRIPTION OF THE PREFERRED EMBODIMENT

Figure 5:
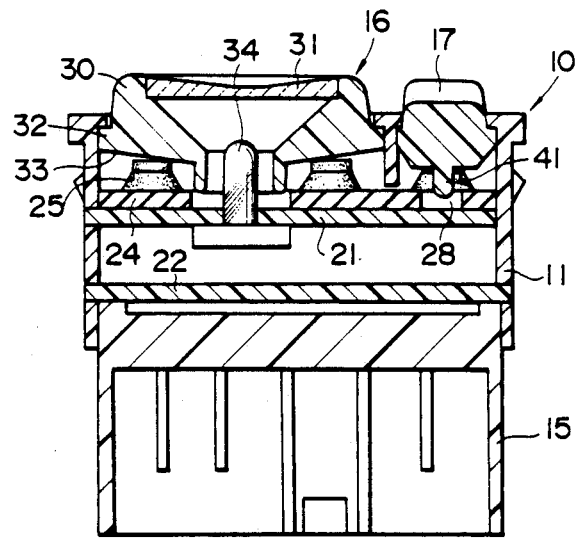
FIG. 5 is a sectional view taken along the line V—V of FIG. 1.
Figure 6:
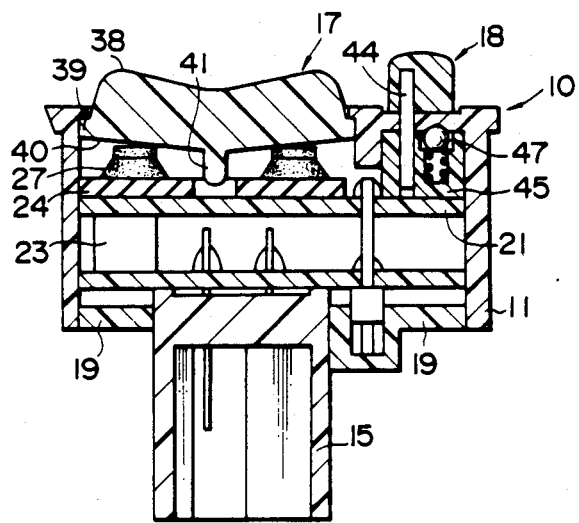
FIG. 6 is a sectional view taken along the line VII—VII of FIG. 1.
Figure 7:
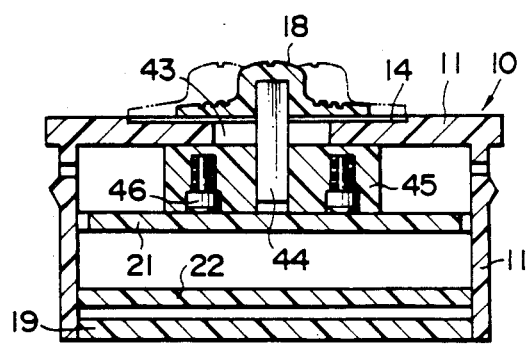
FIG. 7 is a sectional view taken along the line VII—VII of FIG. 1.
Figure 8:
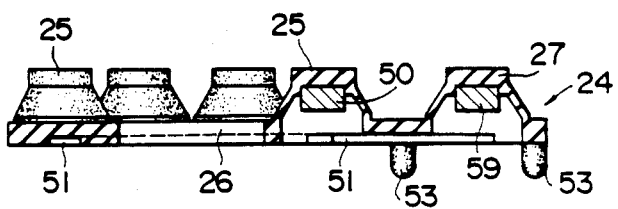
FIG. 8 is a vertical sectional front view of an insulating rubber sheet.
Figure 9:
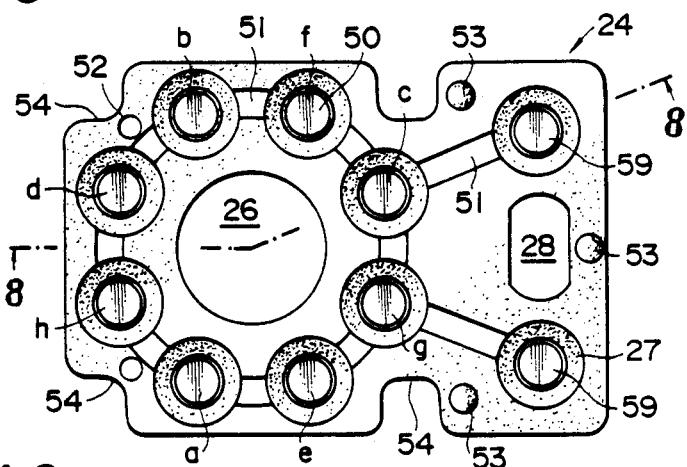
FIG. 9 is a bottom view of the insulating rubber

The preferred embodiment of the multi-position electrical switch of the present invention is illustrated generally in FIGS. 1 to 4. The switch 10 includes a casing 11 having apertures 12, 13 and a recess 14 on its upper surface and a connector 15 fixed to the lower portion of the casing 11. A control knob 16 for adjusting the tilting angle of the rearview mirror and a knob 17 for folding a rearview mirror body are tiltably arranged within the respective apertures 12 and 13, and a knob 18 for selecting either the right or the left side rearview mirror is slidably arranged in the flat recess 14. As shown in FIGS. 5 to 7, a bottom cover 19 is fixed to the periphery of the connector 15 at the lower end of the casing 11, a printed circuit (PC) board 21 and a base plate 22 are disposed one above the other within the casing 11 and are spaced apart through a spacer 23; pins 29 (FIG. 6) and other leads (not shown) are attached between the PC board 21 and a base plate 22. As shown in FIGS. 8 and 9, an insulating rubber sheet 24 is disposed on the PC board 21. A first set of eight hollow frustoconical swells 25 each carrying a movable contact 50 is formed on the sheet 24. In combination with the knob 16 disposed on the eight swells, and with stationary contacts 51 (FIG. 12), an automatic return type multi-position electrical switch is formed.

Figure 1:
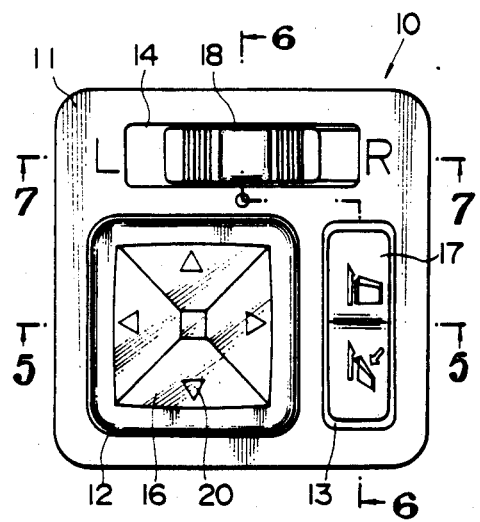
FIG. 1 is a front view of a control switch according to a preferred embodiment of the present invention.

As shown in FIGS. 1 and 5, the control knob 16 for adjusting the tilting angle of the rearview mirror comprises a knob body 30 made of heat resistant material, and being formed with a funnel-shaped central opening. A lens 31 made of acrylic resin is fixed to the upper surface of the lens body to cover the central opening. The knob body 30 has substantially the shape of a rectangular prism provided at its base with peripheral steps 32 which engage inner surface portions of casing 11 around the lower edges of the aperture 12. The bottom of the knob body 30 is formed as a pressing surface 33 in the shape of a quadrangular pyramid having an obtuse apex angle between 160° and 180°, for example. The pressing surface 33 rests on the first set of elastic swells 25 of the insulating rubber sheet 24 disposed on the PC board 21.

Figure 10:
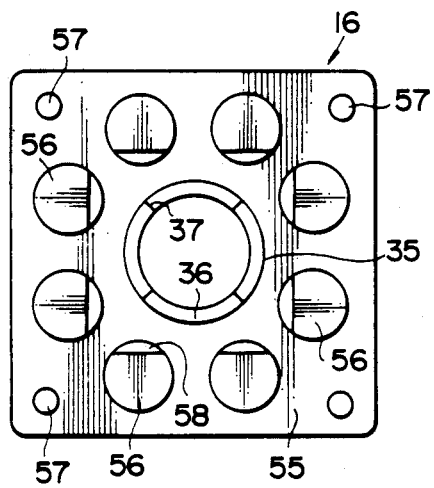
FIG. 10 is a bottom view of a modification of the control knob in the switch of FIG. 5.
Figure 11:
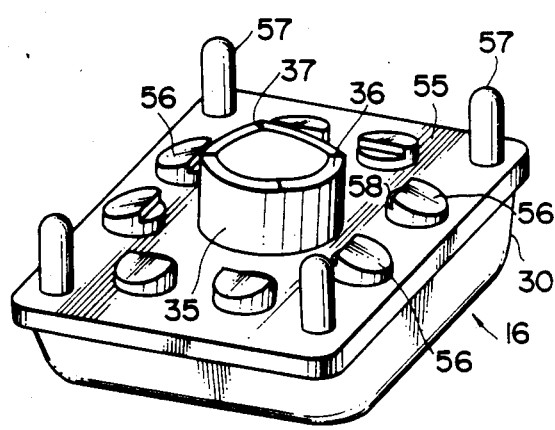
FIG. 11 is a perspective view of a control knob of FIG. 10 as seen from the bottom side.

A tubular cylinder 35 for enclosing a light emitting element 34, such as an illumination lamp or a LED, projects downwardly from the apex portion of the pressing surface 33. The lower end face 36 (FIG. 11) of the cylinder 35 is formed of four downwardly inclined surface sections separated by diametrically opposed peak ridges 37 oriented along the diagonal lines of the knob body 30 (FIGS. 10 and 11). As seen from FIGS. 12 and 13, the downwardly inclined four surface portions of the annular end face 36 of the cylinder 35 form together a section of a quadrangular pyramid which is coaxial with the cylinder and having an obtuse apex angle $2\theta$ selected such that one of the four inclined surface portions abuts against the flat surface of the PC board 21 when the knob body 30 is pressed into a desired tilted position. Reference character l in the drawings designates the maximum height of the inner wall of the cylinder, and character m denotes the minimum height of the inner wall. Arrow signs 20 for indicating the directions of tilting of the mirror, that is upward, downward, rightward and leftward, are marked on the front surface of the lens 31 (FIG. 1).

Knob 17 for controlling the folding of the rearview mirrors is constructed as an automatic return seesaw type pushbutton switch element as indicated in FIGS. 1, 5 and 6. Steps 39 (FIG. 6) are formed on the periphery of the lower part of knob body 38 to engage inner surface portions of casing 11 around the aperture 13. A pressing surface 40 formed by the bottom of body 38 inclines toward the center of the bottom, and a projection 41 extends downwardly from the apex of the pressing surface 40. The pressing surface 40 is provided to press a second set of elastic hollow swells 27 formed on the insulating sheet 24 and each carrying a movable contact 59 (FIGS. 8 and 9). The projection 41 is inserted into an opening 28 formed in the insulating sheet 24.

The knob 18 for selecting either the right- or the left side rearview mirror pertains to a slide type switch element as indicated in FIGS. 1, 6 and 7. The switch element includes an elongated opening 43 provided at the center of the recess 14 on the upper surface of the casing 11, an arm 44 suspended downward from the center of the knob 18 through the opening 43, a slide block 45 connected to the lower end of the arm 44, a pair of spring biased slide contacts 46 guided in the slide block 45 to slidably engage the PC board 21, and spring biased catch means 47 provided on the upper surface of the slide block 45 holding right and left switching positions.

Figure 4:
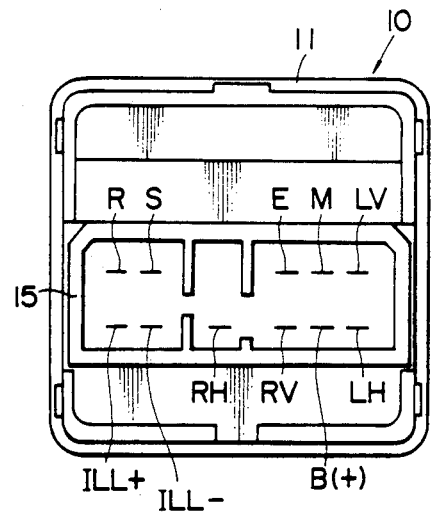
FIG. 4 is a bottom view.
Figure 2:
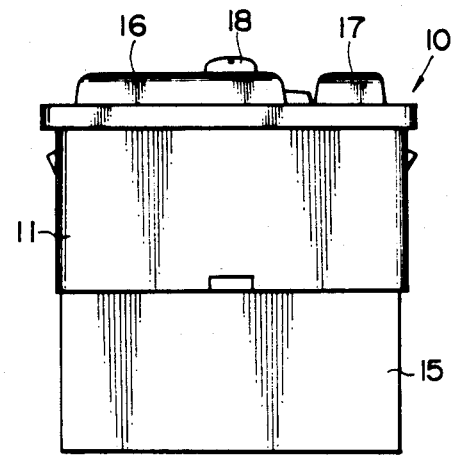
FIG. 2 is an elevational view of FIG. 1.
Figure 3:
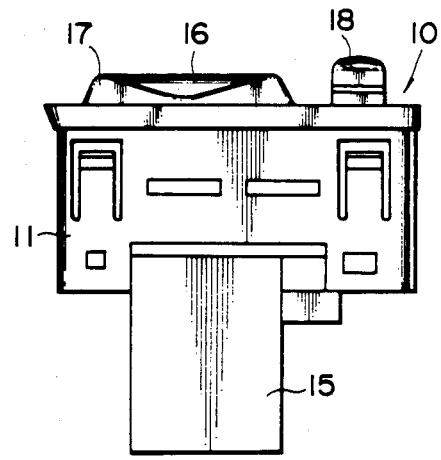
FIG. 3 is a right side view of FIG. 1.

The connector 15 attached to the lower portion of the casing 11 has, as shown in FIG. 4, terminals LV, M, E, S, R, ILL+, ILL−, RH, RV and B(+) whose connections to the control units for the rearview mirrors will be described later with reference to FIG. 14.

The insulating sheet 24, as shown in FIGS. 8 and 9, is provided on its upper surface with eight elastic swells 25 carrying the movable contacts 50 for adjusting the rearview mirror angle and two elastic swells 27 carrying the movable contacts 59 for controlling the folding of the rearview mirror bodies. A circular opening 26 is formed in the left part of the sheet, and an elongated opening 28 is formed in the right part of the sheet. The eight swells 25 are spaced at equal intervals around the periphery of the circular opening 26, and the two swells 27 are located at positions opposite the ends of the elongated opening 28. Movable contacts 50, 59 are fixed to the inner surfaces at the top of the respective swells 25 and 27, and when a pair of the elastic swells 25 is depressed by the inclination of the control knob 16, the movable contacts are displaced under pressure against the stationary contacts on the PC board to close the control circuit.

Elongated recesses 51 are formed in the insulating sheet 24 between individual swells 25 and 27 to allow air flow therebetween at the time of recovery of the swells, thus improving the flexibility of the latter. Two small openings 52 for introducing air into the recesses 51 are provided at a pair of swells 25, and two small projections 53 for positioning the insulating sheet are provided near the swells 27. The periphery of the insulating sheet 24 is formed with cutouts 54 for receiving the end of a stopper suspended from the four corners of the control knob 16 as it will be described in detail later.

In the embodiment of FIG. 5, the bottom of knob 16 has the shape of a pyramidal pressing surface 33 inclining toward the center of the bottom. In the embodiment shown in FIGS. 10 and 11, the bottom 55 of knob 16 is flat and the inclined pressing surfaces are provided on top of eight projections 56 arranged at equal intervals around the cylinder 35 opposite to the first set of swells 25 on the insulating rubber sheet 24. Steps 58 facing the cylinder 35 are formed in the upper rim portions of the projections 56 to avoid interference with the depressed pair of swells 25 at the time of inclination of the knob 16. Pin-shaped stoppers 57 for delimiting the tilting angle are projected at the four corners of the bottom surface 55 of the knob 16.

Figure 12:
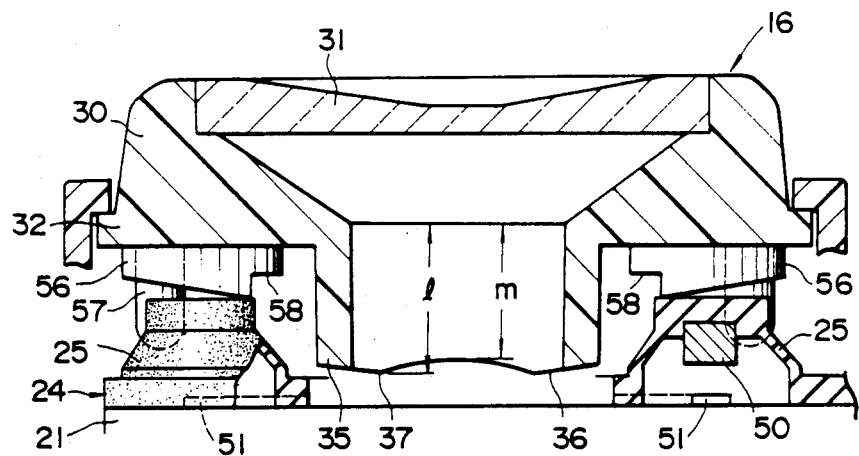
FIG. 12 is an enlarged sectional side view of the control knob of FIG. 10 showing the movable contacts on the insulating rubber sheet in their rest position.
Figure 13:
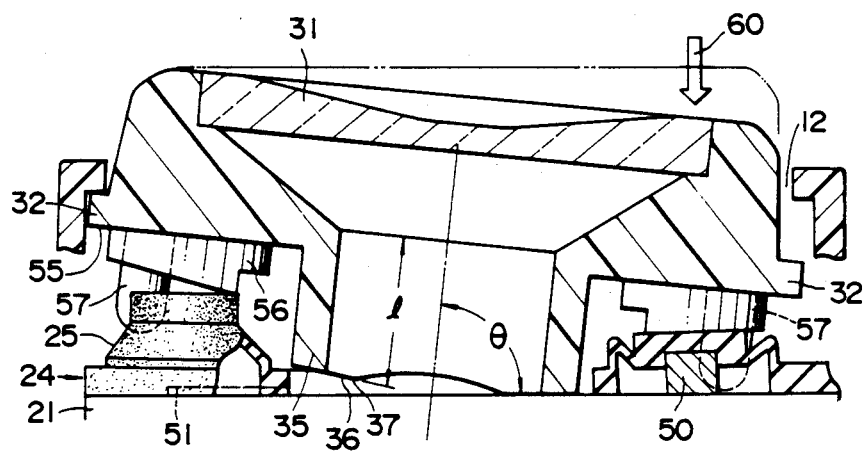
FIG. 13 is an enlarged sectional side view showing the actuating position of the control knob of FIG. 12.

In the rest position of the knob 16, as shown in FIG. 12, all elastic swells 25 in the first set are erected and lift the knob 16 via projections 56 into the illustrated level position. The step 32 on the periphery of the lower part of the knob is in engagement with the inner edge of the aperture 12 in casing 11, and the free end face 36 of the cylinder is in its raised position separated from the PC board 21. Therefore, the movable contacts 50 are disconnected from the stationary contacts on the PC board. When a pair of swells 25 is depressed as indicated by arrow 60 in FIG. 13 by inclining the knob body 30 the upper edge of the peripheral step 32 at the side of the knob which is not depressed acts as a fulcrum while the depressed opposite side of the knob presses down the corresponding pair of movable contacts 50 to abut against the stationary contacts on the PC board. The inclined surface section 36 of the annular end face of the cylinder 35 is contacted with the upper surface of the PC board 21 and the knob is prevented from being further inclined by the right side stoppers 57. As shown in FIG. 9, the knob pin stoppers 57 contact with the upper surface of the printed circuit board through cutouts 54 formed at opposite edges of the insulating rubber sheet 24. Since the inclined surface sections 36, 37 and the stoppers, 57 are actuated individually for each of the four directions of inclination of the knob body, when the knob is inclined in one direction, only the movable contacts of the selected pair of swells can be moved into their ON position and cannot be accidentally inclined to other directions. Consequently, an erroneous operation is reliably prevented. When the pressing is released, the knob 16 is returned to the original rest state by the elastic force of the swells 25, and the contact is opened.

The knob 17 (FIGS. 6 and 7) for controlling the folding of the rearview mirrors cooperates with the second set of elastic swells 27, with the projection 41, acting as a fulcrum. The knob 17 is depressed to collapse by its sloping bottom surfaces 33 one of the two swells 27 to turn ON the corresponding movable contact 59, and returning it into OFF position by releasing the depression. In other words, when one of the swells 27 is pressed by inclining the knob 17, the contact is turned ON or OFF in the same manner as in the operation of the first set of swells 25.

Figure 14:
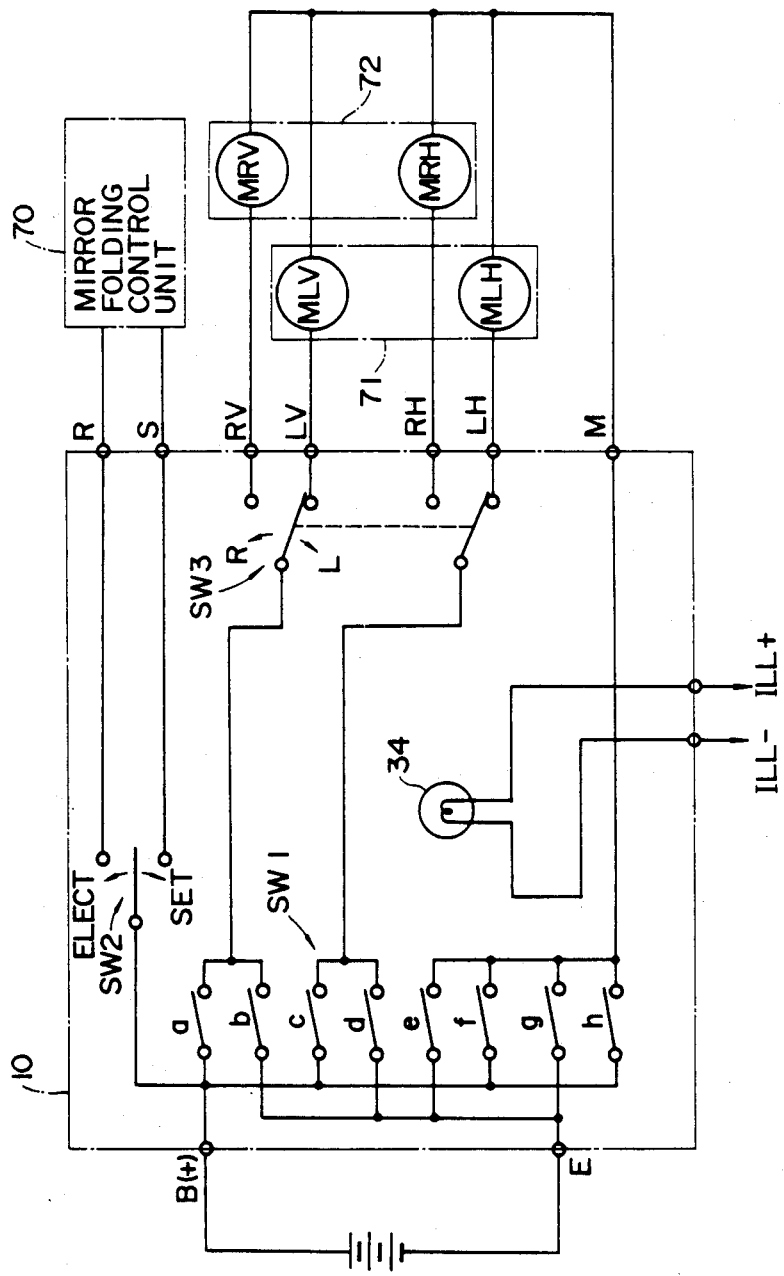
FIG. 14 shows an electric circuit diagram of the arrangement for controlling the rear view mirrors including the control switch of this invention.

FIG. 14 shows a control circuit diagram of a door rearview mirror with the control switch 10 of this invention. Left and right door rearview mirrors 71, 72 contain electric motors MLV,MRV for adjusting the tilting angle in upward or downward direction of the mirror elements, electric motors MLH,MRH for adjusting the tilting angle in the horizontal direction of the mirror elements, and electric motors (not shown) for holding the mirror elements. Eight movable contacts a,b,c, . . . , h (denoted by reference numeral 50 in the first set of swells 25) and the corresponding stationary countercontacts on the PC board are indicated as switch SW1 (knob 16). The contacts are connected via terminals B(+), E to a battery and via a switch SW3 (knob 17) and terminals RV, LV, RH, LH and M to the electric motors MLV, MRV, MLH, MRH in such a manner as to reverse their polarity in dependency on the direction of inclination of the knob 16. The switch SW3(knob 18) serves for selecting the left- or right side rearview mirror by slide contacts 46,46 (FIG. 7). The folding switch SW2 (knob 17) including the movable contacts 57 in the swells 27 is connected to a control unit 70 for folding a rearview mirror through a reset terminal R and a set terminal S. This control unit 70 is composed, for example, of self-holding relay circuits and a group of limit switches (not shown) for regulating the angle of rotation of right- and left side rearview mirror body. Terminals ILL− and ILL+ serve for supplying power to the lamp 34.

When the knob 18 of the slide switch element SW3 for selecting the left- or right side rearview mirror is operated while the control knob 18 is inclined, the pair of swells 25 compressed by the pressing projections 56 displaces the corresponding movable contacts 50 downwardly, thereby closing the circuit of the opposite stationary contacts on the PC board 21. Thus, either of the electric motors MLV, MRV, MLH or MRH in the mirror body can be driven to adjust the tilting angle of the selected mirror in the vertical or horizontal direction. The electric motor is continuously driven while the control knob 16 is being depressed; when the depressing is released, the swells 25 return to their rest position and lift their movable contacts 50 to open the circuit, thereby stopping the electric motor. Thus, the desired tilting angle of the rearview mirror is adjusted. When the knob 17 is depressed to turn ON the contact of set terminal S or reset terminal R, a signal is input to the control unit 70 to rotate the electric motor (not shown) contained in the mirror body so as to turn the right or left side rearview mirror body from an erected state to a set position, or vice versa.

Figure 15:
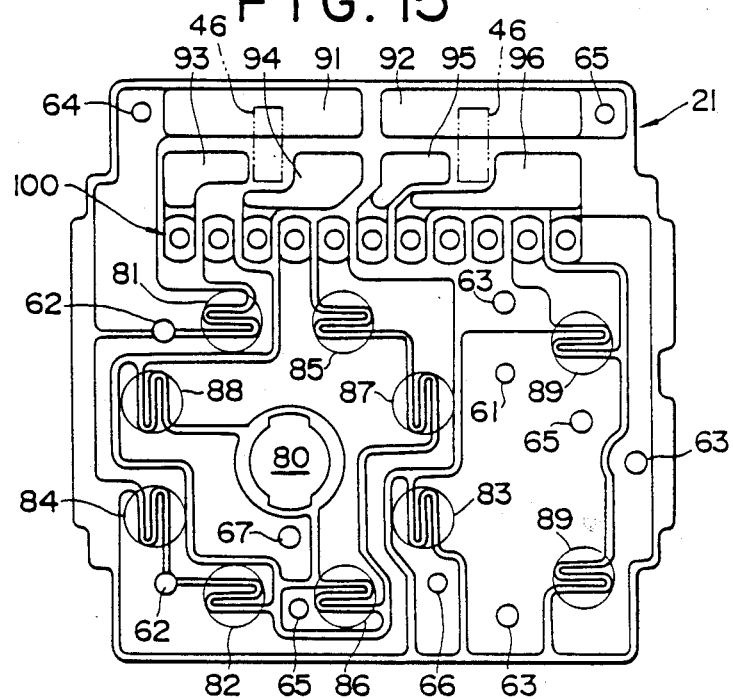
FIG. 15 is a plan view of a printed circuit board in the switch of the invention.
Figure 16:
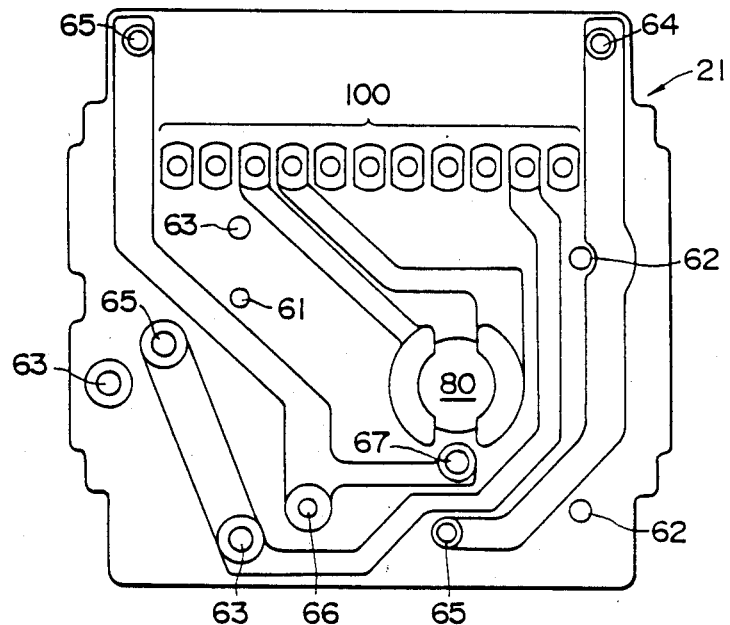
FIG. 16 is a rear view of the board of FIG. 15.
Figure 17:
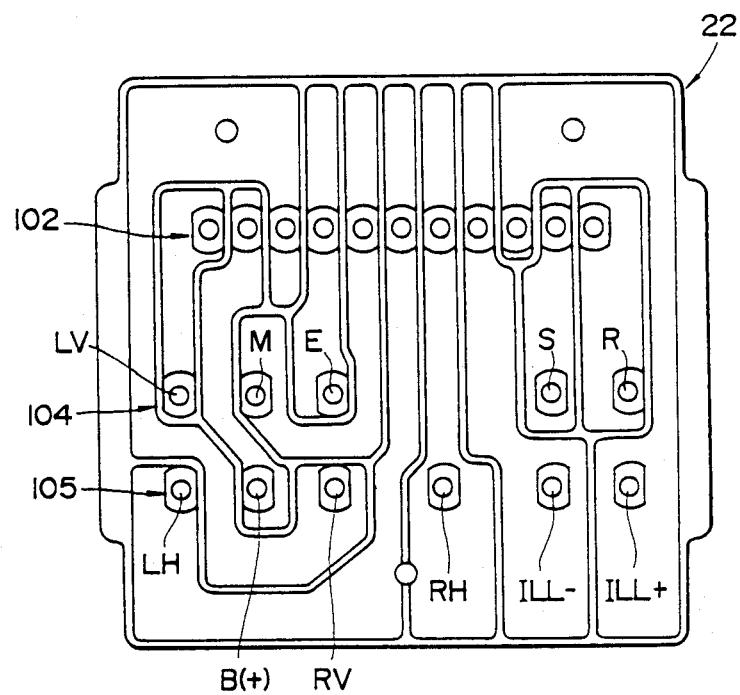
FIG. 17 is a plan view of a base plate of the switch of the invention.

Referring to FIGS. 15 to 17 a PC board 21 supports on both sides thereof conductor lines of predetermined circuit patterns (FIGS. 15 and 16), and a base plate 22 (FIG. 17) is formed with conductor lines only on the upper surface thereof. The PC board 21 is formed with a row of metal-plated through holes 100, and the base plate 22 is formed with a corresponding row of metal-plated through holes 102. Pins 29 are penetrated through the aligned holes 100 and 102, and soldered to the metallization (see FIG. 6).

The PC board 21 further includes holes 62 formed at positions below the small openings 52 of insulating rubber sheet 24, holes 61 formed at positions corresponding to that of recesses 51, small openings 63 at positions corresponding to projections 53 on the back surface of the insulating rubber sheet 24 and holes 64, 65, 66 and 67 for interconnecting conductor lines on the front and back surfaces of the PC board.

As shown in FIG. 15, the PC board 21 further includes an opening 80 through which a light emitting element 34 is inserted, at the left lower side of the row of the through holes 100 thereof, and is formed with 8 stationary contacts 81 to 88 metal-plated on the same circumference of the surface of the board with the opening 80 as a center. These stationary contacts are disposed at positions corresponding to movable contacts a to h fixed in the swell of the insulating rubber sheet 24 shown in FIG. 9. A switch SW1 shown in FIg. 14, i.e., a multi-position switch for adjusting the tilting angle of the rear view mirror includes these stationary contacts 81 to 88 and the movable contacts a to h.

As shown in FIG. 15, another set of the stationary contacts 89 is formed at the right side of the PC board. These stationary contacts 89 are disposed, as shown in FIGS. 6, 8 and 9, at positions corresponding to that of the movable contacts 59 fixed in the swells 27. Further, conductor lines 91 to 96 formed at the tops of the metal-plated through holes 100 on both side surfaces of the PC board are disposed at positions corresponding to slide contacts 46 shown in FIG. 7. The right- or left mirror selecting switch SW3 includes these conductor lines and the slide contacts. Two slide contacts 46 shown by dash-dot lines in FIG. 15 are illustrated in their neutral position.

The base plate 22 has, as shown in FIG. 17, rows of metal-plated through holes 104 and 105, in addition to the through holes 102. The holes 104 are sequentially soldered with terminals LV, M, S and R, and the holes 105 are soldered sequentially with terminals LC, B(+), RV, RH, ILL− and ILL+ when viewed from left side toward right side in FIG. 17. As a result, the through-holes 100 of PC board 21 connected by pins 29 with through holes 102 are sequentially connected with terminals LV, B(+), RV, E, M, LH, RH, ILL−, ILL+, S and R, when viewed from left side toward right side of FIG. 15.

As described above, the cylinder 35 is provided to contain the light elitting element 34 in the control knob. Therefore, the position of the illuminated knob can be clearly recognized even at the time of driving a vehicle at night, and the control of the rearview mirror can be easily achieved. In addition, the cylinder increases the reliability of the operation of the switch by stabilizing the insulating distance between the non-activated contacts. Further, since the movable contacts are disposed within the hollow elastic swells of the insulating rubber sheet, the contacting or separating operation of the movable contacts can be performed in a very simple manner.

Moreover, since the means for delimiting the tilting angle is provided under the inclining knob, it not only prevents the contacts from a simultaneous shortcircuiting when the knob is depressed at its center, but also prevents the knob from erroneously operating in more than one direction.

While the invention has been partially shown and described with reference to a preferred embodiment thereof, it will be understood by those skilled in the art that various changes in form and details may be made therein without departing from the spirit and scope of the invention.

What is claimed is:

1. A multi-position control switch for controlling rearview mirrors of a motor vehicle, comprising a casing and a printed circuit board supporting an array of stationary contacts; an insulating rubber sheet covering the top side of the printed circuit board and carrying an array of movable contacts arranged opposite said stationary contacts; a control knob having a bottom side supported on said rubber sheet in the region of said array of movable contacts; a cylindrical projection attached to a central part of said bottom side of the knob and extending into an opening in said rubber sheet; said knob being tiltable from a rest position in which all movable contacts are spaced apart from said stationary contacts, into predetermined tilted positions in which said bottom side resiliently compresses a portion of said rubber sheet to connect corresponding movable contacts with the opposite stationary contacts; a plurality of pin-shaped stoppers attached to said bottom side to delimit the tilting movements of said knob by contacting through cutouts in the insulating rubber sheet with the printed circuit board in the respective tilted positions; at least the portions of said bottom side which act on said movable contacts being inclined such as to evenly engage a depressed region of said rubber sheet when the knob is in a tilted position; and the free end face of said cylindrical projection being formed with a plurality of inclined surface sections each being oriented such as to fully engage the printed circuit board when said knob is in a tilted position.

2. A multi-position control switch as defined in claim 1, wherein said knob and said cylindrical projection are formed with a central opening, and said printed circuit board supporting a light emitting element extending through said opening in the rubber sheet into said central opening in the cylindrical projection.

3. A multi-position control switch as defined in claim 2, wherein said central opening in the knob is funnel-shaped and covered by a lens, said lens being provided with signs to visually indicate the tilting directions of the knob.

4. A multi-position control switch as defined in claim 2, wherein said knob has a top side projecting through an aperture in the top wall of said casing and peripheral steps engaging inner surface portions of the top wall around said aperture to act as a fulcrum during the tilting of the knob.

5. A multi-position control switch as defined in claim 4, wherein said rubber sheet is formed with hollow swells each having a configuration of a truncated cone, said swells being situated opposite said stationary contacts, said knob being supported on the truncated portions of said swells, and said movable contacts being attached to the inner surface of said truncated portions, respectively.

6. A multi-position control switch as defined in claim 5, wherein said knob has a quadrangular configuration, and said plurality of said pin-shaped stoppers being attached to corner areas of said bottom side to delimit four tilted positions.

7. A multi-position control switch as defined in claim 6, further comprising a slide switch element mounted in the top wall of said casing and including means for selecting one of said mirrors to be operated by said control knob, and a multi-position control switch element arranged in an aperture in the top wall of said casing and including means for controlling the folding of respective mirrors.

8. A multi-position control switch as defined in claim 7, wherein said multi-position control switch element includes a pair of stationary contacts fixed on said printed circuit board, a pair of additional hollow swells formed in said rubber sheet opposite said pair of stationary contacts, a second control knob supported for tilting movement on said additional hollow swells, and inner surface portions of said additional swells supporting movable contacts cooperating with said pair of stationary contacts.

* * * * *